US010968986B1

(12) United States Patent
Sung et al.

(10) Patent No.: US 10,968,986 B1
(45) Date of Patent: Apr. 6, 2021

(54) ELECTRIC VEHICLE

(71) Applicant: LG ELECTRONICS INC., Seoul (KR)

(72) Inventors: Changwoo Sung, Seoul (KR); Yoonuk Kim, Seoul (KR); Junggu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/899,755

(22) Filed: Jun. 12, 2020

(30) Foreign Application Priority Data

Jan. 14, 2020 (KR) .................. 10-2020-0004789

(51) Int. Cl.
*F16H 3/72* (2006.01)
*B60K 17/08* (2006.01)

(52) U.S. Cl.
CPC .............. *F16H 3/728* (2013.01); *B60K 17/08* (2013.01); *F16H 2200/0021* (2013.01); *F16H 2200/2007* (2013.01); *F16H 2200/2038* (2013.01)

(58) Field of Classification Search
CPC ............. F16H 3/728; F16H 2200/2038; F16H 2200/2007; F16H 2200/0021; B60K 17/08
See application file for complete search history.

(56) References Cited

U.S. PATENT DOCUMENTS

| 5,593,358 A * | 1/1997 | Frost .................. F16H 37/04 475/207 |
| 10,422,389 B2 | 9/2019 | Ebihara |
| 2010/0267508 A1* | 10/2010 | Hvolka ................ F16H 3/54 475/149 |
| 2013/0109524 A1* | 5/2013 | Kaltenbach ........... B60W 20/40 475/5 |

FOREIGN PATENT DOCUMENTS

| CN | 110513476 A | 11/2019 |
| JP | 2017-026056 A | 2/2017 |
| WO | WO 2019/111460 A1 | 6/2019 |

OTHER PUBLICATIONS

European Search Report for European Patent Application No. EP 20 18 0693, dated Dec. 16, 2020, 9 pages.

* cited by examiner

*Primary Examiner* — David J Hlavka
(74) *Attorney, Agent, or Firm* — Finnegan, Henderson, Farabow, Garrett & Dunner, LLP (57) ABSTRACT

An electric vehicle includes a disc fixed to a housing. The electric vehicle also includes a first shaft connected to a motor and rotatable by the motor, and a second shaft connected to a wheel and spaced apart from the first shaft. Further, the electric vehicle includes a hub press-fitted to an outer circumference of the second shaft, and a sleeve spline-coupled with an outer circumference of the hub. The sleeve is slidable between the first shaft and the disc. The electric vehicle operates in any one of a driving mode, a neutral (Continued)

mode, and a parking mode according to a position of the sleeve.

19 Claims, 9 Drawing Sheets

ELECTRIC VEHICLE

CROSS-REFERENCE TO RELATED APPLICATION

This application claims the benefit of Korean Patent Application No. 10-2020-0004789, filed on Jan. 14, 2020, in the Korean Intellectual Property Office, the disclosure of which is incorporated herein in its entirety by reference.

BACKGROUND

1. Field

The present disclosure relates to an electric vehicle, and one particular embodiment thereof relates to an electric vehicle having a driving mode, a neutral mode, and a parking mode.

2. Description of the Related Art

In recent years, the demand for electric vehicles using electricity as a power source is increasing, instead of internal combustion vehicles using oil as a power source which causes pollution.

An electric vehicle may drive wheels by rotating a motor using electric power charged in a battery. However, the maximum charging capacity and energy efficiency of the battery are considerably limited, so it is necessary to maximize the maximum distance for the electric vehicle to run, by reducing the weight of the electric vehicle.

For example, since an electric vehicle drives wheels by a motor, a transmission used in an existing internal combustion vehicle that drives a wheel by an engine may be unnecessary, and instead, a speed reducer may be installed to reduce a rotational speed of the motor and increase a torque thereof.

SUMMARY

Since a speed reducer installed in an electric vehicle does not include a clutch, unlike a transmission used in an existing internal combustion vehicle, it may not be easy to implement, in the electric vehicle, a neutral mode in which power transmission between a motor side and a wheel side is disconnected unless an additional mechanism is additionally mounted.

However, in a situation where the battery is fully charged or when coasting of the vehicle is to be implemented, it is necessary to prevent regenerative braking in a mechanical manner, and thus, it is necessary to easily implement the neutral mode in the electric vehicle.

Various embodiments of the present disclosure are to provide an electric vehicle that implements a driving mode, a neutral mode, and a parking mode using a simple mechanism.

According to an aspect, there is provided an electric vehicle capable of operating in any one of a driving mode, a neutral mode, and a parking mode according to a position of a sleeve between a disc fixed to a housing and an input shaft (e.g., a first shaft) connected to a motor.

For example, the electric vehicle may include a disc fixed to a housing, a first shaft connected to a motor to be rotated depending to a rotational force of the motor, a second shaft connected to a wheel and spaced apart from the first shaft, a hub press-fitted to an outer circumference of the second shaft, and a sleeve spline-coupled with an outer circumference of the hub and provided to be slidable between the first shaft and the disc. The electric vehicle may operate in any one of a driving mode, a neutral mode, and a parking mode according to the position of the sleeve.

For example, the sleeve may be coupled with the first shaft in the driving mode, coupled with the disc in the parking mode, and decoupled from the first shaft and the disc in the neutral mode.

For example, the first shaft may include a first clutch gear at an end portion facing the sleeve, and, in the driving mode, the sleeve may be coupled with the first shaft by engaging with the first clutch gear.

For example, the disc may include a second clutch gear at an end portion facing the sleeve, and, in the parking mode, the sleeve may be coupled with the disc by engaging with the second clutch gear.

For example, the electric vehicle may further include a planetary gear set, and the planetary gear set may include a sun gear, a ring gear fixedly disposed to surround the sun gear, a plurality of pinion gears disposed to engage with an outer circumference of the sun gear and an inner circumference of the ring gear, and a carrier coupled with rotating shafts of the pinion gears. The sun gear may be coupled with a rotating shaft of the motor. The first shaft may be fixed to the carrier and rotated integrally with the carrier.

For example, the ring gear may be fixed to the housing.

For example, the first shaft and the second shaft may be spaced apart from each other in the same axis direction.

According to another aspect, the electric vehicle may further include a first output gear coupled with an outer circumference of the second shaft, and a second output gear disposed to engage with the first output gear and coupled with an outer circumference of a third shaft that is spaced apart from the first shaft and the second shaft.

For example, in response to the electric vehicle operating in the driving mode, the sleeve may be coupled with the first shaft, thereby transmitting power from the motor to the wheel through the hub and the second shaft.

For example, in response to the electric vehicle operating in the neutral mode, the sleeve may be decoupled from each of the first shaft and the disc, thereby restricting power transmission between the motor and the wheel.

For example, in response to the electric vehicle operating the parking mode, the sleeve may be coupled with the disc, thereby causing the driving of the wheels to be restricted by the housing.

Another aspect of the present disclosure, there is provided an electrical vehicle including a planetary gear set, a disc fixed to a housing, a hub press-fitted to an outer circumference of a second shaft spaced apart from a first shaft, and a sleeve spline-coupled with an outer circumference of the hub and disposed to be slidable between the first shaft and the disc. The planetary gear set may include a sun gear connected to a rotating shaft of a motor to be rotated depending on a rotational force of the motor, a ring gear disposed to be fixed to the housing in an outside of the sun gear with a plurality of pinion gears being interposed between the sun gear and the ring gear, the plurality of pinion gears disposed to engage with an outer circumference of the sun gear and an inner circumference of the ring gear, and a carrier coupled with rotating shafts of the plurality of pinion gears to be rotated about a first shaft.

For example, the electric vehicle may operate in any one of a driving mode, a neutral mode, and a parking mode according to a position of the sleeve.

For example, the sleeve may be positioned to be coupled with the first shaft in the driving mode, positioned to be coupled with the disc in the parking mode, and positioned to be decoupled from the first shaft and the disc in the neutral mode.

For example, in the parking mode, the sleeve may be coupled with the disc by engaging with a first clutch gear provided at an end portion of the disc.

For example, the housing may be screw-coupled to the disc to be fixed thereto.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", "includes," etc. specify the presence of stated features, integers, steps, operations, elements, components, or combinations thereof, but do not preclude the presence or addition of one or more other features, integers, steps, operations, elements, components, or combinations thereof.

Figure 1A:
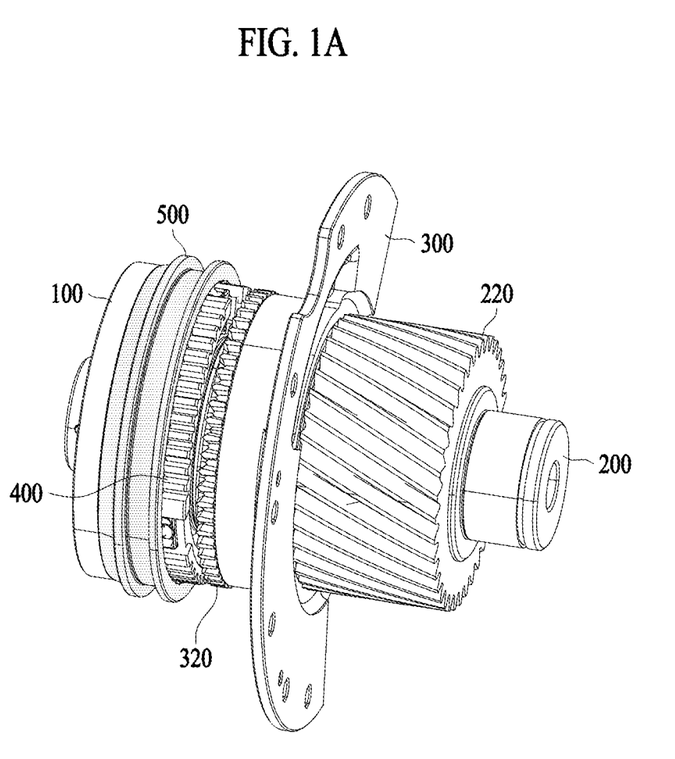
FIGS. 1A to 1C are perspective views illustrating one state of a speed reducer structure of an electric vehicle according to various embodiments of the present disclosure.
Figure 1B:
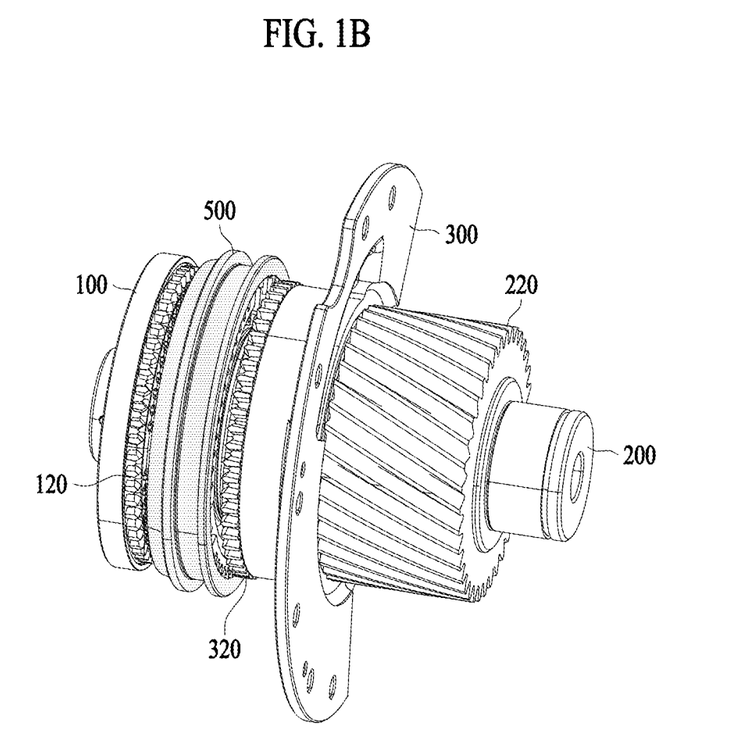
Figure 1C:
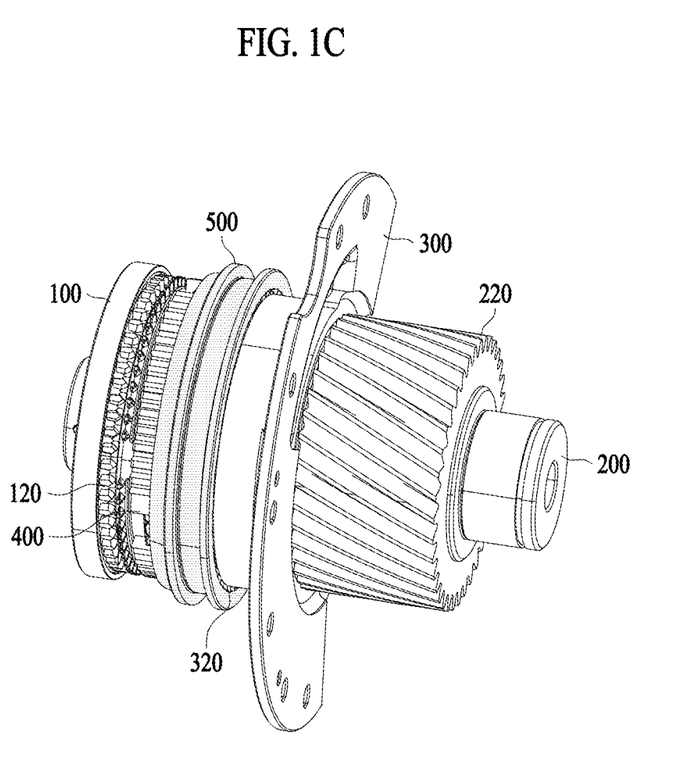
Figure 2A:
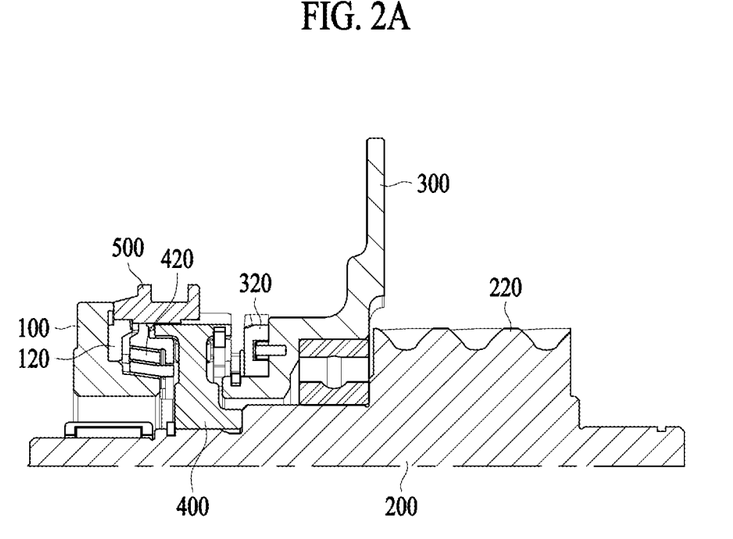
FIGS. 2A to 2C are cutaway cross-sectional views illustrating one state of a speed reducer structure of an electric vehicle according to various embodiments of the present disclosure.
Figure 2B:
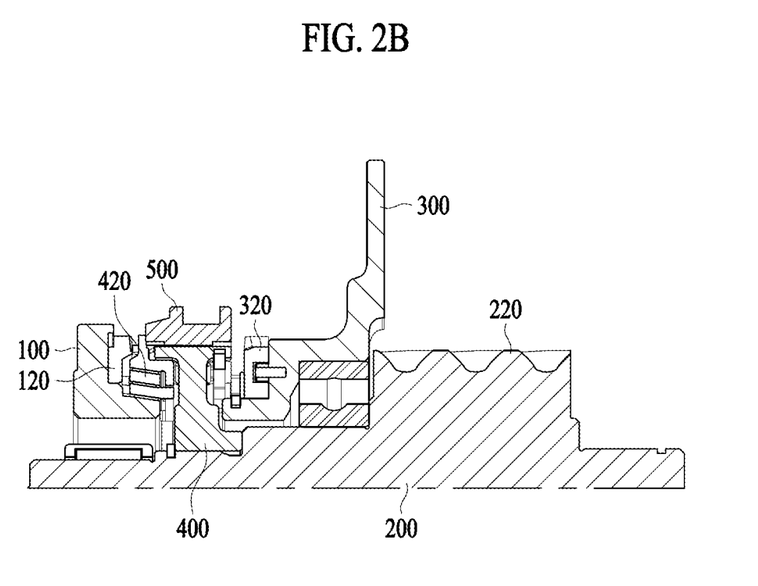
Figure 2C:
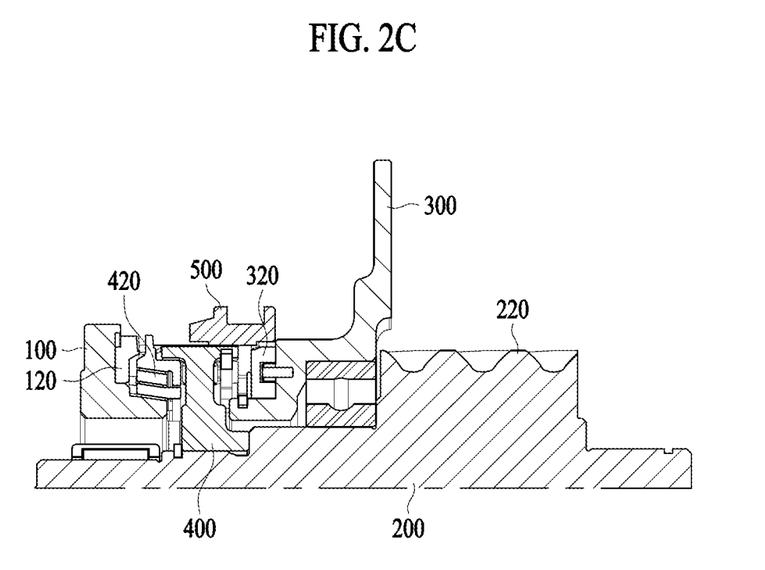

FIG. 1A to 1C are perspective views illustrating a speed reducer structure of an electric vehicle according to various embodiments of the present disclosure, and FIGS. 2A to 2C are cutaway cross-sectional views illustrating the structure of the speed reducer corresponding to FIGS. 1A to 1C, respectively.

An electric vehicle according to various embodiments of the present disclosure may include a battery and a motor.

For example, the motor (not shown) may receive power from a battery (not shown) to generate a rotational torque. In addition, the motor may charge the battery by supplying power to the battery at a time of regenerative braking.

The motor may include a rotor and a stator. For example, the rotor may be rotated depending on electromagnetic interaction with the stator, and an input shaft (e.g., a first shaft 100) connected to the motor may be rotated by the rotation of the rotor. In addition, the input shaft may transmit power to a wheel connected to an output shaft (e.g., a second shaft 200).

For example, referring to FIGS. 1A to 2C, the electric vehicle according to various embodiments may include the first shaft 100 connected to the motor (not shown) to be rotated depending on a rotational force of the motor, and the second shaft 200 connected to the wheel (not shown) to be rotated integrally with the wheel.

The first shaft 100 and the second shaft 200 may be spaced apart from each other, and thus, power transmission between the first shaft 100 and the second shaft 200 may be restricted unless the first shaft 100 and the second shaft 200 are connected by an additional configuration (e.g., a sleeve 500). For example, the first shaft 100 and the second shaft 200 may be spaced apart from each other in a same axis direction.

Instead of being connected directly to the wheel, the second shaft 200 may be connected to the wheel through a first output gear 220, a second output gear 240 (see FIG. 5) engaged with the first output gear 220, and a third shaft which is a rotating shaft of the second output gear. For example, the first output gear 220 may be coupled with an outer circumference of the second shaft 200 or may be integrally formed with the second shaft 200.

The first shaft 100 and the second shaft 200, being spaced apart from each other, may be coupled through a hub 400 and the sleeve 500.

For example, the hub 400 may be press-fitted to the outer circumference of the second shaft 200, and the sleeve 500 may be coupled with an outer circumference of the hub 400 in a spline manner.

Meanwhile, a disc 300 may be disposed on one side of the second shaft 200. For example, the hub 400 may be interposed between the first shaft 100 and the disc 300. The second shaft 200 and the disc 300 may be also disposed to be spaced apart from each other. Unless coupled by another configuration, the second shaft 200 may be rotated independently, regardless of the disc 300. For example, the disc 300 may be disposed on the same axis with the first shaft 100 and the second shaft 200.

While being connected to the hub 400, the sleeve 500 may slidably move along the outer circumference of the hub 400 in an axial direction. For example, the sleeve 500 may slidably move on the outer circumference of the hub 400 to be coupled with the first shaft 100 or the disc 300.

According to various embodiments, the electric vehicle may operate in any one of a driving mode, a neutral mode, and a parking mode according to a position of the sleeve 500.

For example, as shown in FIGS. 1A and 2A, when the sleeve 500 slidably moves in a direction toward the first shaft 100 and is coupled with the first shaft 100, the electric vehicle may operate in a driving mode. For example, the driving mode may refer to a state in which the wheel is allowed to be driven by power of the motor.

In the driving mode, the power transmitted from the motor of the electric vehicle may be transmitted to the wheel through the first shaft 100, the sleeve 500, the hub 400, and the second shaft 200. Meanwhile, in the driving mode, when the wheel is rotated by an external force, a rotational force may be transmitted to the motor through the second shaft 200, the hub 400, the sleeve 500, and the first shaft 100 and regenerative braking may take place.

The first shaft 100 may include a first clutch gear 120 at an end portion facing the sleeve 500.

For example, in the driving mode, the sleeve 500 may slidably move in a direction toward the first shaft 100 to engage with gear teeth of the first clutch gear 120. In doing so, the first shaft 100 and the sleeve 500 may be coupled with (or fastened to) each other. Since the sleeve 500 is coupled with the second shaft 200 through the hub 400, if the sleeve 500 is coupled with the first shaft 100, the first shaft 100 and the second shaft 200 may also be coupled with each other, thereby allowing power transmission between the first shaft 100 and the second shaft 200.

According to an embodiment, the electric vehicle may further include a friction cone 420 between the first clutch gear 120 and the hub 400. For example, the friction cone 420 may first contact one surface of the first shaft 100 as the sleeve 500 slidably moves in a direction toward the first shaft 100. The friction cone 420 may serve to synchronize a rotational speed of the first shaft 100 and a rotational speed of the second shaft 200 through a friction surface in contact with the first shaft 100. When the sleeve 500 is engaged with the first clutch gear 120, the friction cone 420 may minimize damage to the gear teeth caused by a difference in rotational speed between the first shaft 100 and the second shaft 200.

Meanwhile, as shown in FIGS. 1C and 2C, the sleeve 500 may be coupled with the disc 300 by slidably moving in a direction opposite to the direction toward the first shaft 100, that is, a direction toward the disc 300. In this case, the electric vehicle may operate in the parking mode. For example, the parking mode may refer to a state in which the electric vehicle is parked so that the wheel is not to be driven to be rotated by the motor or the external force.

The disc 300 may include a second clutch gear 320 at an end portion facing the sleeve 500. In the parking mode, the sleeve 500 may slidably move in the direction toward the disc 300 to engage with gear teeth of the second clutch gear 320. As a result, the disc 300 and the sleeve 500 may be coupled with each other. As described above, since the sleeve 500 is spline-coupled with the hub 400 and the hub 400 is press-fitted to the second shaft 200, the disc 300 may be coupled with the second shaft 200 through the sleeve 500.

Figure 5:
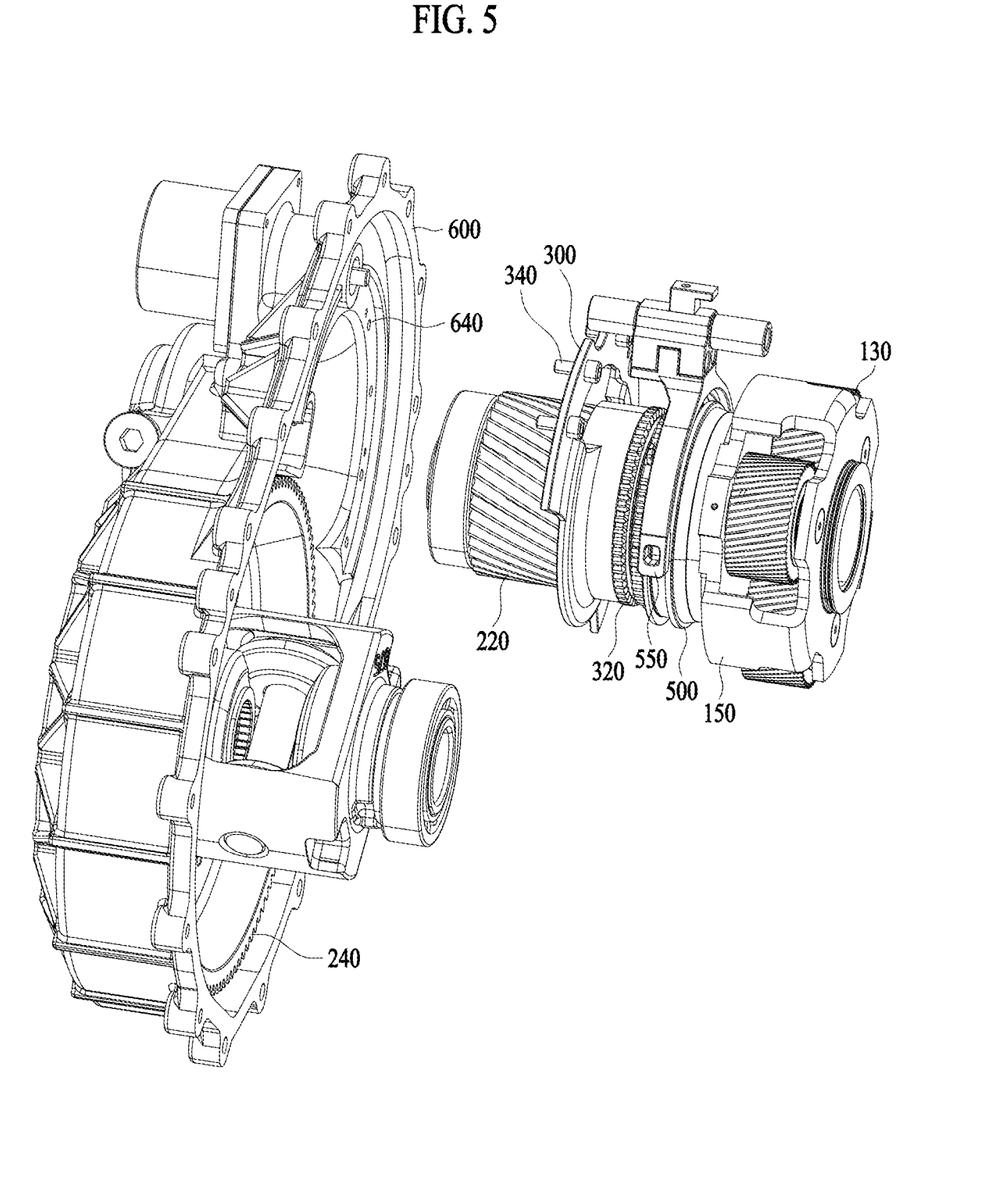
FIG. 5 is a schematic diagram illustrating a housing fastening position of a speed reducer according to an embodiment of the present disclosure.

The disc 300 may be fixed to a housing 600 (see FIG. 5). For example, in the parking mode, the disc 300 may be formed in a plate shape that generally surrounds the outside of the second shaft 200 in order to firmly fix the second shaft 200 to the housing. The plate-shaped disc 300 may be provided with a plurality of screw holes spaced apart from each other along a circumferential direction. The housing may be screw-coupled with the disc 300 at a position where the plurality of screw holes are formed, thereby distributing and supporting a load generated in the parking mode.

For example, in the parking mode, when the second shaft 200 is coupled with the disc 300 by the sleeve 500, driving the second shaft 200 and the wheel connected to the second shaft 200 may be restricted by the disc 300 fixed to the housing. In this manner, the parking mode of the electric vehicle may be implemented.

Meanwhile, according to various embodiments of the present disclosure, in the parking mode, the second shaft 200 may be fixed to the housing 600 through the disc 300 while power transmission with the first shaft 100 is restricted. Therefore, in the parking mode, even when a load is generated in the motor as an input signal is generated in an accelerator pedal, the second shaft 200 may not receive power from the motor.

For example, take an existing comparative example in which the parking mode is implemented by fixing a specific configuration to the housing while the first shaft 100 and the second shaft 200 are connected. In this case, in order not to allow the wheel to be rotated in the parking mode, the wheel has to be fixed to an extent where the wheel can support even the maximum load occurring in the motor.

On the other hand, in the electric vehicle according to various embodiments of the present disclosure, since the second shaft 200 connected to the wheel is disconnected from the first shaft 100 connected to the motor in the parking mode, it is possible to stably fix the wheel in the parking mode, regardless of the load of the motor.

Referring to FIGS. 1B and 2B, the sleeve 500 may not be coupled with any one of the first shaft 100 and the disc 300 on the outer circumference of the hub 400. In this case, the electric vehicle may operate in the neutral mode.

For example, when the electric vehicle operates in the neutral mode as shown in FIGS. 1B and 2B, the first shaft 100 connected to the motor and the second shaft 200 connected to the wheel may be rotated independently of each other. For example, even if the first shaft 100 rotates at a predetermined speed as the motor is driven, the second shaft 200 may not rotate. Even if the second shaft 200 rotates as the wheel is driven by an external force, a rotational force of the second shaft 200 may not be transmitted to the first shaft 100.

As described above, since the electric vehicle is able to implement the neutral mode mechanically. It is possible to provide an appropriate function corresponding to a user's intent in a variety of situations, for example, when the user wants to generate no regenerative braking, such as the case of coasting at a constant speed, or when the user wants to push out the electric vehicle by an external force after parking the electric vehicle.

Figure 3:
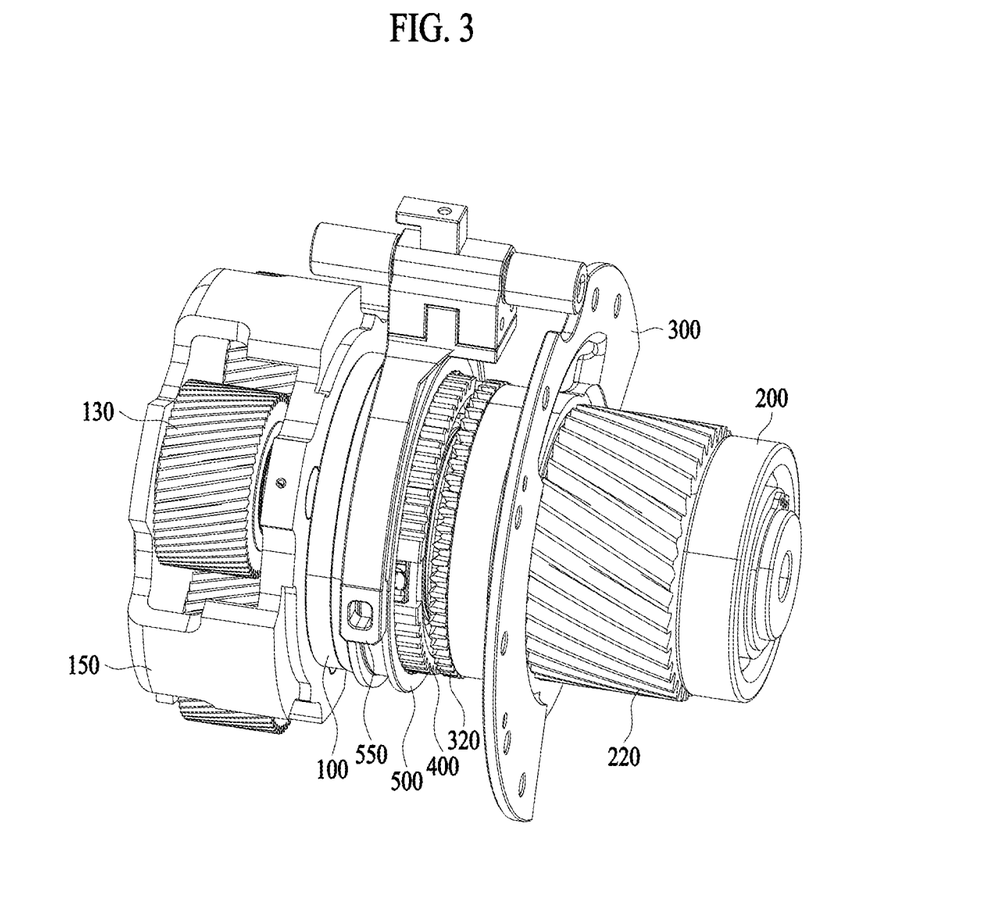
FIG. 3 is a perspective view illustrating a speed reducer structure of an electric vehicle according to an embodiment of the present disclosure.
Figure 4:
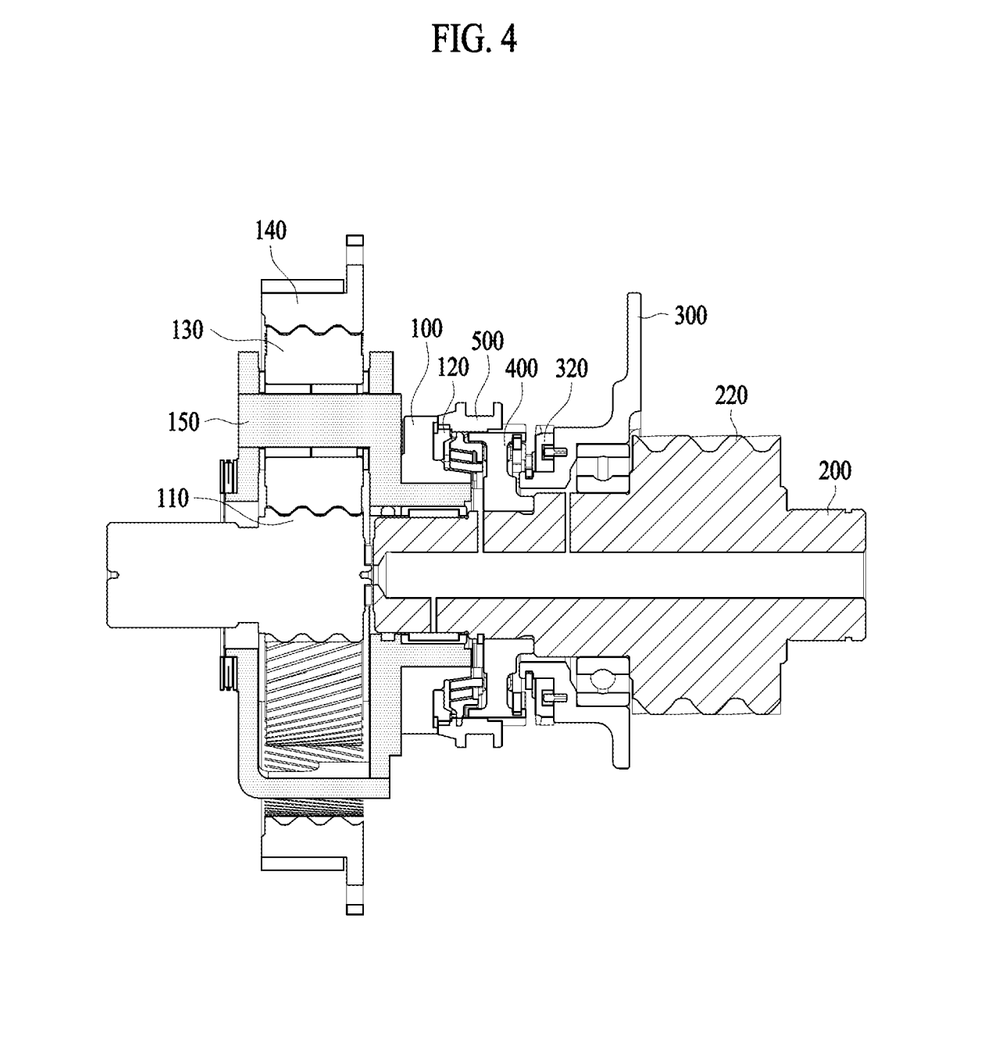
FIG. 4 is a cutaway cross-sectional view illustrating a speed reducer structure according to an embodiment of the present disclosure.

FIG. 3 is a perspective view illustrating a speed reducer structure of an electric vehicle according to an embodiment of the present disclosure. FIG. 4 is a cutaway cross-sectional view of the speed reducer structure of the electric vehicle of FIG. 3.

Referring to FIGS. 3 and 4, an electric vehicle according to various embodiments may include a planetary gear set and may provide a function of a speed reducer using the planetary gear set.

For example, the planetary gear set may include a sun gear 110, a plurality of pinion gears 130, a ring gear 140, and a carrier 150.

For example, the sun gear 110 may be connected to a rotating shaft of the motor (not shown) or integrally formed with the rotating shaft of the motor to be rotated depending on a rotational force of the motor.

The ring gear 140 may be disposed to surround the sun gear 110 in an outside of the sun gear 110 with the pinion gears 130 being interposed therebetween. In one embodiment, the ring gear 140 may be fixed to the housing and thus rotation of the ring gear 140 may be restricted.

The pinion gears 130 may be disposed to engage with gear teeth formed on an outer circumference of the sun gear 110 and an inner circumference of the ring gear 140.

The carrier 150 may be integrally coupled with rotational shafts of the pinion gears 130, respectively, and may be rotated about a first shaft 100.

The planetary gear set may transmit a rotational force of the motor to the first shaft, and may serve as a speed reducer to reduce the rotational speed of the motor and increase a torque, as necessary.

Meanwhile, as described with reference to FIGS. 1A to 2C, according to various embodiments of the present disclosure, an electric vehicle according to various embodiments may transmit power of the first shaft 100 in the driving mode based on a position of the sleeve 500, independently drive the first shaft 100 and the second shaft 200 in the neutral mode, or restrict the driving of the second shaft 200 through the disc 300 in the parking mode.

According to various embodiments, an outer circumferential surface of the sleeve 500 may be coupled with a driving fork 550. For example, the electric vehicle may operate in one of the driving mode, the neutral mode, and the parking mode by moving the position of the sleeve 500 under the control of the driving fork 550.

FIG. 5 is a schematic diagram illustrating a location at which a speed reducer (e.g., the speed reducer of FIG. 3) is coupled with a housing according to an exemplary embodiment of the present disclosure.

According to one embodiment, as shown in FIG. 5, the sleeve 500 may slidably move under the control of the drive fork 550 to couple the first shaft connected to an input terminal (e.g., the carrier 150 included in the planetary gear set) and the second shaft in the driving mode, and the sleeve 500 may transmit power of the input terminal to the second shaft.

The first output gear 220 coupled with the outside of the second shaft may be externally engaged with the second output gear 240 and may transmit the power to a rotating shaft (e.g., a third shaft) of the second output gear 240. At this point, additional deceleration may be performed according to a gear ratio of the first output gear 220 and the second output gear 240.

In addition, in the parking mode, the sleeve 500 may be coupled with the disc 300, thereby fixing the second shaft to the disc 300. As the disc 300 is fastened and fixed to a groove 640 at one side of the housing 600 through a screw 340, the disc 300 may prevent rotation of the second shaft (or the third shaft) connected to the disc 300.

An electric vehicle according to various embodiments of the present disclosure may implement the driving mode, the neutral mode, and the parking mode by using a simple mechanism. In particular, as the weight of the electric vehicle is not unnecessarily increased, it is possible to enable optimized driving according to a driver's intent without degrading driving performance.

In addition, as the electric vehicle implements the parking mode in a state in which power transmission between the motor side and the wheel side is disconnected, it is possible to provide a more stable parking function.

It will be appreciated by those skilled in the art that the present disclosure can be embodied in specific forms other than those set forth herein without departing from the spirit and essential characteristics of the present disclosure.

Therefore, the above embodiments should be construed in all aspects as illustrative and not restrictive. The scope of the disclosure should be determined by the appended claims and their legal equivalents, and all changes coming within the meaning and equivalency range of the appended claims are intended to be embraced therein.

What is claimed is:

1. An electric vehicle, comprising:
   a disc fixed to a housing;
   a first shaft connected to a motor and configured to be rotated by the motor;
   a second shaft connected to a wheel and spaced apart from the first shaft;
   a hub press-fitted to an outer circumference of the second shaft; and
   a sleeve spline-coupled with an outer circumference of the hub, wherein the sleeve is configured to be slidable between the first shaft and the disc,
   wherein the electric vehicle is configured to operate in one of a driving mode, a neutral mode, or a parking mode based on a position of the sleeve.

2. The electric vehicle of claim 1, wherein the sleeve is coupled with the first shaft in the driving mode, coupled with the disc in the parking mode, and decoupled from the first shaft and the disc in the neutral mode.

3. The electric vehicle of claim 2,
   wherein the first shaft comprises a first clutch gear at an end portion facing the sleeve, and
   wherein, in the driving mode, the sleeve is coupled with the first shaft by engaging with the first clutch gear.

4. The electric vehicle of claim 2,
   wherein the disc comprises a second clutch gear at an end portion facing the sleeve, and
   wherein, in the parking mode, the sleeve is coupled with the disc by engaging with the second clutch gear.

5. The electric vehicle of claim 1, further comprising a planetary gear set that comprises:
   a sun gear;
   a ring gear fixedly disposed to surround the sun gear;
   a plurality of pinion gears configured to engage with an outer circumference of the sun gear and an inner circumference of the ring gear; and
   a carrier coupled with rotating shafts of the pinion gears,
   wherein the sun gear is coupled with a rotating shaft of the motor, and
   wherein the first shaft is fixed to the carrier and rotated integrally with the carrier.

6. The electric vehicle of claim 5, wherein the ring gear is fixedly coupled to the housing.

7. The electric vehicle of claim 1, wherein the first shaft and the second shaft are spaced apart from each other in an axial direction.

8. The electric vehicle of claim 1, further comprising:
   a first output gear coupled with an outer circumference of the second shaft; and a second output gear configured to engage with the first output gear and coupled with an outer circumference of a third shaft that is spaced apart from the first shaft and the second shaft.

9. The electric vehicle of claim 1, wherein, in response to the electric vehicle operating in the driving mode, the sleeve is coupled with the first shaft, thereby transmitting power from the motor to the wheel through at least the hub and the second shaft.

10. The electric vehicle of claim 1, wherein, in response to the electric vehicle operating in the neutral mode, the sleeve is decoupled from each of the first shaft and the disc, thereby restricting power transmission between the motor and the wheel.

11. The electric vehicle of claim 1, wherein, in response to the electric vehicle operating in the parking mode, the sleeve is coupled with the disc, thereby causing driving of the wheel to be restricted by the housing.

12. An electrical vehicle, comprising:
a planetary gear set;
a disc fixedly coupled to a housing;
a first shaft;
a hub press-fitted to an outer circumference of a second shaft spaced apart from the first shaft; and
a sleeve spline-coupled with an outer circumference of the hub, wherein the sleeve is configured to be slidable between the first shaft and the disc,
wherein the planetary gear set comprises:
a sun gear connected to a rotating shaft of a motor and configured to be rotated by the motor;
a ring gear fixed to the housing and surrounding the sun gear;
a plurality of pinion gears interposed between the sun gear and the ring gear, the plurality of pinion gears configured to engage with an outer circumference of the sun gear and an inner circumference of the ring gear; and
a carrier coupled with rotating shafts of the plurality of pinion gears and configured to be rotated about the first shaft,
wherein the electronic vehicle is configured to operate in one of a driving mode, a neutral mode, or a parking mode based on a position of the sleeve.

13. The electric vehicle of claim 12, wherein the sleeve is coupled with the first shaft in the driving mode, coupled with the disc in the parking mode, and decoupled from the first shaft and the disc in the neutral mode.

14. The electric vehicle of claim 13, wherein, in the parking mode, the sleeve is coupled with the disc by engaging with a first clutch gear provided at an end portion of the disc.

15. The electric vehicle of claim 13, wherein, in the driving mode, the sleeve is coupled with the first shaft by engaging with a second clutch gear provided at an end portion of the first shaft.

16. The electric vehicle of claim 12, wherein the first shaft, the second shaft, and the carrier are disposed on a same axis.

17. The electric vehicle of claim 12, wherein the second shaft is connected with a wheel to transmit power to the wheel.

18. The electric vehicle of claim 12, further comprising:
a first output gear coupled with an outer circumference of the second shaft; and
a second output gear configured to engage with the first output gear and coupled with an outer circumference of a third shaft connected to the wheel.

19. The electric vehicle of claim 12, wherein the disc is screw-coupled to the housing.

* * * * *